United States Patent [19]

Masuda et al.

[11] 4,250,421
[45] Feb. 10, 1981

[54] ROTOR ASSEMBLY FOR STEPPING MOTOR

[75] Inventors: Katsuya Masuda, Tokyo; Asao Saitou, Tokorozawa, both of Japan

[73] Assignee: Citizen Watch Company Limited, Tokyo, Japan

[21] Appl. No.: 912,274

[22] Filed: Jun. 5, 1978

[30] Foreign Application Priority Data

Jun. 7, 1977 [JP] Japan ................................. 52-66966

[51] Int. Cl.³ ............................................ H02K 21/08
[52] U.S. Cl. ..................................... 310/156; 310/44; 310/49 R
[58] Field of Search .................. 310/156, 261, 49, 42, 310/83, 44; 58/23 D

[56] References Cited

U.S. PATENT DOCUMENTS

| 3,872,334 | 3/1978 | Loubier | 310/44 X |
| 3,909,647 | 9/1975 | Peterson | 310/156 |
| 3,943,698 | 3/1976 | Ono | 310/156 X |
| 4,035,677 | 7/1977 | Kusayama et al. | 310/156 X |
| 4,060,745 | 11/1977 | Linscott, Jr. | 310/261 X |
| 4,095,129 | 6/1978 | Tanai et al. | 310/49 |

*Primary Examiner*—Donovan F. Duggan
*Attorney, Agent, or Firm*—Jordan and Hamburg

[57] ABSTRACT

A rotor assembly for a stepping motor, in which a protecting member fixedly is mounted on a rotor shaft and including a hub portion extending coaxially with the rotor shaft, and at least one face portion radially outwardly extending from said hub portion, and a rotor magnet having an inner bore and an outer periphery formed by etching a magnetic body of an intermetallic compound is mounted on the protecting member.

10 Claims, 18 Drawing Figures

ROTOR ASSEMBLY FOR STEPPING MOTOR

The present invention relates to a permanent magnet for a rotor assembly installed in a small-size motor of a movable magnet rotor type, e.g. a stepping motor for use in a timepiece. More particularly, the present invention is concerned with an annular rotor magnet featuring a high energy output and prepared by machining a flat body of a rare earth intermetallic compound which is hard and brittle. The present invention comtemplates to provide rotor magnets showing favorable magnetic characteristics at high yield and low cost.

Major materials heretofore employed for the production of rotor magnets are typified by platinum-cobalt and ferrite. Platinum-cobalt magnets are expensive to manufacture and provide only relatively small energy though it facilitates mass-production of magnets with a high accuracy as by pressing techniques. Ferrite magnets on the other hand are obtainable very incostly and with a good yield by powder molding if a certain fall of the precision is permissible, but their energy outputs are critically poor. Thus, such traditional magnets are obliged to have bulky sizes because of their small energy outputs.

There is an increasing demand in the art of quartz crystal wristwatches for a stepping motor which, with small dimensions, can provide a large torque and consumes only a small electric current. To meet this demand, there have been developed magnets made of rare earth intermetallic compounds, particularly samarium-cobalt. Though cheaper, lighter in weight and smaller in size (small electric current consumption) as compared with a platinum-cobalt magnet, a samarium-cobalt magnet is disadvantageous in that, since it is an anisotropic magnet and undergoes sintering, an acceptable machining precision is unachievable unless it is sintered as a large mass because of the weight loss and blow holes attributable to the sintering step. Another drawback of the samarium-cobalt magnet is that it is hard and brittle and cannot readily be machined and, when cut, has its magnetic characteristics deteriorated by the stress. Accordingly, there have been practiced, for instance, lapping which gives priority to magnetic characteristics rather than cost and yield or a process in which powdered samarium-cobalt is molded with plastics into a mass whereafter the mass is punched to enhance the economy and yield at the sacrifice of magnetic characteristics. However, the magnetic characteristics can no longer be sacrificed today when we come to think of a demand for a small current consumption timepiece whose battery life is as long as 2–3 years, derived from the current popularity of quartz crystal timepieces.

It is therefore an object of the present invention to provide a method of manufacturing a rotor magnet for use in a stepping motor.

It is another object of the present invention to provide a rotor magnet which is suited for mass production, economical to manufacture, small in size and light in weight with no sacrifice to magnetic property. In the accompanying drawings.

Figure 1:
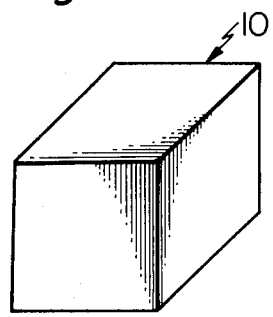
FIGS. 1 to 9 are views illustrating a prior art rotor magnet manufacturing method.
Figure 2:
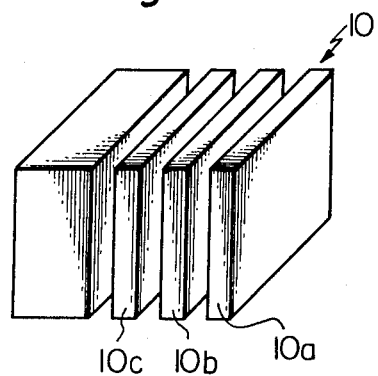
Figure 3:
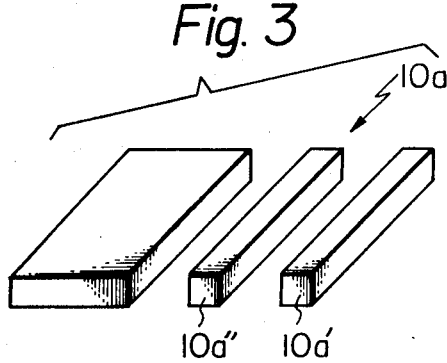
Figures 4, 5:
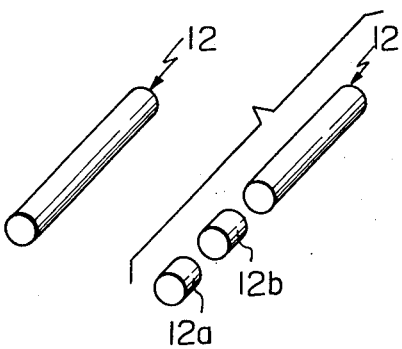
Figure 6:
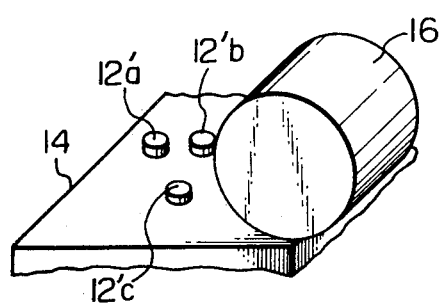
Figure 7:
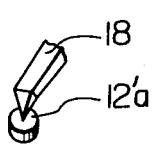
Figure 8:
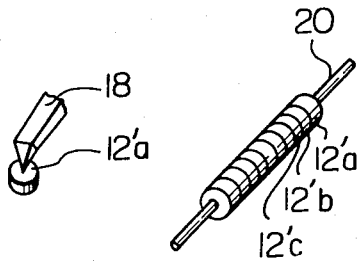
Figure 9:
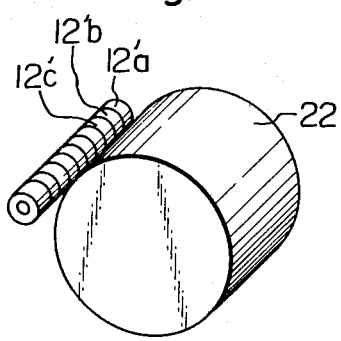
Figure 10:
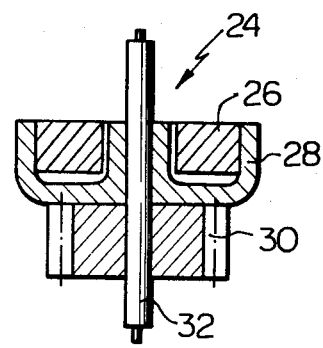
FIG. 10 is a sectional view of a conventional rotor assembly.
Figure 11:
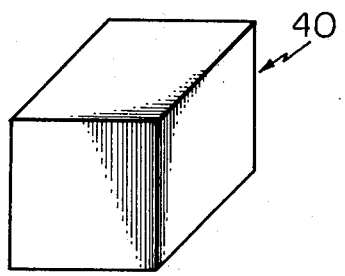
FIGS. 11–15 show a series of steps for the production of rotor magents according to the present invention.

Conventional method of manufacturing a rotor magnet is depicted in FIGS. 1–10, in which FIG. 1 shows a mass body 10 of a magnet prepared by molding and sintering samarium-cobalt powder in a unidirectional magnetic field and generally sized $50 \times 50 \times 50$ mm$^3$. The sintered mass body 10 is cut by a wire saw or like tool to provide flat plates 10a, 10b, 10c as shown in FIG. 2, each plate being generally 2–5 mm thick. Each of the flat plates is then cut by a wire saw or the like into rectangular rods 10'a, 10''a as shown in FIG. 3, whereafter each of the rods is shaped by grinding to obtain a round bar or rod 12 as indicated in FIG. 4. The yield in the steps mentioned so far is generally less than 50%. The rod shown in FIG. 4 is then cut by a wire saw or others into tablet-shaped pieces 12a, 12b as seen in FIG. 5. These tablet-shaped pieces are then placed on a work table 14 and subject to grinding process using a grinding wheel 16 as shown in FIG. 6 to obtain rotor magnets having proper thickness and parallelism. Each of the resultant magnetic pieces is throughly bored in its center by electro spark machining or like technique indicated at 18 in FIG. 7 such that the diameter of the hole is preferably made small to minimize the influence of the deformation. The magnetic pieces have their central holes increased to a prescribed diameter by using a lapping member 20 in a manner shown in FIG. 8. The outer peripheries of the above pieces are ground by a grinding wheel 22, with the central holes of the pieces being used as a positional reference until they are provided with prescribed dimensions. The annular magnetic piece thus provided is assembled into a magnet rotor assembly 24 as shown in FIG. 10. The rotor assembly comprises a rotor magnet 26, a protecting member 28, a shaft 32 and a pinion 30.

Though the above process for producing magnets may enhance the decrease in the current consumption of timepieces without substantial fall of the magnetic characteristics, it is disadvantageous in the economic aspect because of the complicated procedures.

The present invention comtemplates the provision of a rotor magnet which is suited for mass-production, economical to manufacture, small in size and light in weight with no sacrifice to magnetic property involved, and a manufacturing method therefor.

Figure 12:
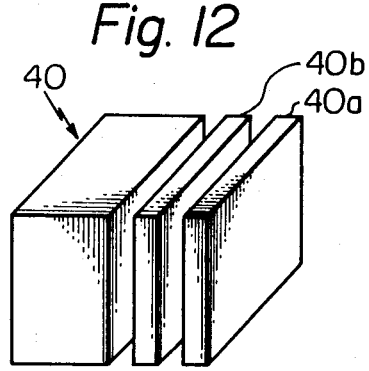
Figure 13:
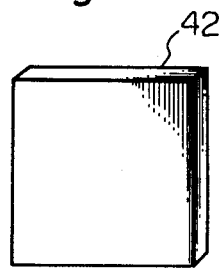
Figure 14:
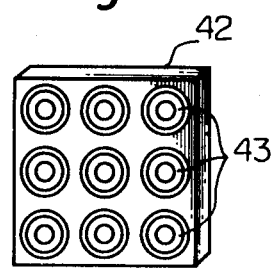

A rotor magnet manufacturing method of the present invention will be described below. FIG. 1 illustrates a magnetic mass body 40 of a rare earth intermetallic compound and prepared, for example, by molding and sintering, in a magnetic field, a powdery composition whose major components are $SmCO_5$, $SmCO_7$ or $Sm_2CO_{17}$. The magnetic mass body 40 is then cut by a wire saw or like tool into flat plates 40a, 40b as shown in FIG. 12. The procedures up to this step are the same as those of the prior art method discussed above. Each of the flat plates are then subject to a grinding step so that the flat plate has a proper thickness and parallelism as indicated at 42 in FIG. 13. Preferably, the flat plate 42 is etched by 0.5 $\mu$m to 1 $\mu$m in thickness to eliminate a cracked layer, a thermally deformed layer, etc., which might result from the grinding step. This will facilitate the increase of the yield in the following steps. In the step shown in FIG. 14, a photo-resist is applied onto the flat plate 42 shown in FIG. 13 whereupon a pattern of rotor magnets is printed and developed for photoetching. In the example shown in FIG. 14, a photo-resist is applied to a surface of the flat plate 42 to provide a thickness of 0.5 to 4 μ m. A solution of ferric chloride was heated up to 40° C. and used for etching. The etching step was completed in 4 to 6 minutes. The time period in which the etching is carried out depends on the fatigue of the ferric chloride solution and like factors inherent in etching. The magnetic piece after the etching step is shown in a perspective view in FIG. 15. The rotor magnet 44 in FIG. 15 has a central through-hole 44a and an annular projection 44b formed around an outer periphery of the magnet 44 at a boundary between the etched and non-etched areas. Depending on the progress of the etching step, another annular projection may also be formed in the intermediate on the etched surface of an inner periphery of the magnet.

The dimensional accuracy of the contour provided by etching is proportional to the thickness of the flat plate, and the economically advantageous accuracy is generally understood to be 5 to 10% of the thickness. Within this accuracy range, the yield is generally 80 to 95%. For the measurement of the dimensions, it is a usual practice to measure the diameter of the annular projection of the rotor magnet. The height of the projection is generally 5 to 10% of the plate thickness and the width is not more than ¼ of the same. With these in view, a series of experiments were conducted and found that 90% or more yield is achievable by grinding the annular projection inherent in etching completely. As such is also applicable to metallic magnets formed of amorphous substances which do not involve metallic bond.

Figure 15:
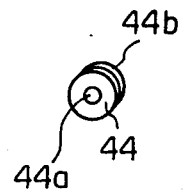
Figure 16:
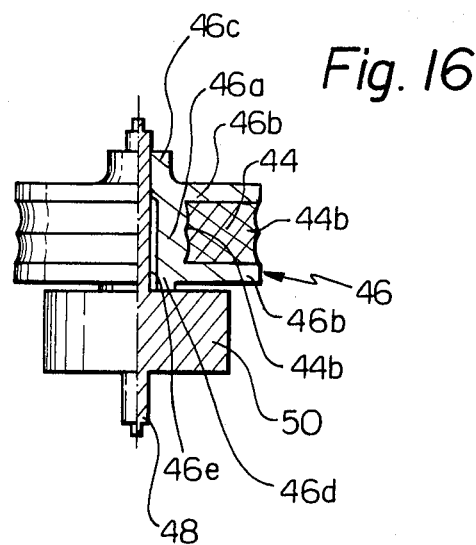
FIGS. 16 to 18 are partly cut-away sectional views of rotor assemblies incorporating rotor magnets according to the present invention.

FIG. 16 illustrates a preferred embodiment of a rotor assembly according to the present invention incorporating the rotor magnet shown in FIG. 15. In FIG. 16, the rotor assembly comprises, in addition to the rotor magnet 44, a spacer 46 serving as a protecting member, a shaft 48 and a pinion 50. The spacer 46 which is formed of a synthetic resin by injection molding and having a through-bore 46e comprises a hub portion or inner wall 46a coaxially extending with the shaft 48 and engaging at its outer periphery with an inner periphery of the magnet 44, a pair of face portions 46b radially and outwardly extending from the hub portion 46a and engaging with side surfaces of the magnet 44, and annular projections 46c, 46d axially extending from the hub portion 46a in opposite directions. The projection 46c engages with the shaft 48, and the projection 46d engages with the pinion 50.

Figure 17:
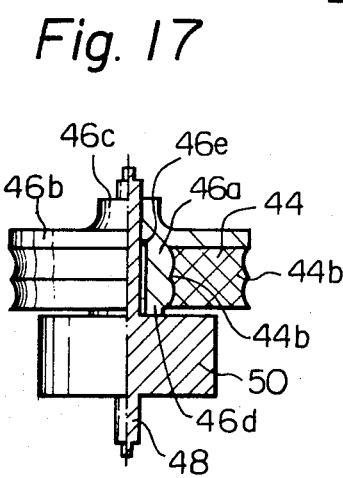

A modification of the rotor assembly is shown in FIG. 17. The motor assembly shown in FIG. 17 has only one annular flange or face portion 46b affording a decrease in the thickness by 100–250 μ m.

Figure 18:
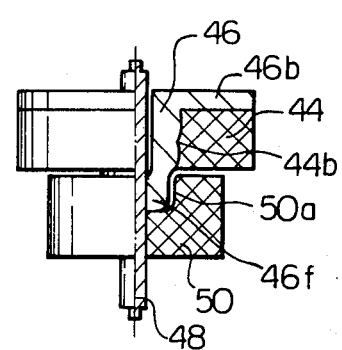

Another modification of the rotor assembly depicted in FIG. 18 achieves a further thinner construction with the aid of annular axial projections 46f disposed in an annular recess 50a of the pinion 50. To facilitate firm grip between the shaft 48 and the spacer 46, the shaft 48 may be provided with a stepped portion. In the event of integral molding of the magnet 44 and the spacer 46, if an outer periphery of the rotor magnet is ground as shown in FIG. 18, the dividing surfaces of a molds may coincide with the parallel surfaces of the magnet, promoting easy separation of the molds and, moreover, the magnet is positioned with respect to both its outer periphery and parallel surfaces with the resultant increase in the accuracy. Consequently, assemblies free from unwanted protrusions are producible on mass-production basis. This is because the engagement of the rotor magnet and the spacer is made firm enough to unnecessitate any additional structures by the projections 44b derived from the etching process.

While the present invention has been shown and described with reference to particular embodiments, it should be noted that various other changes or modifications may be made without departing from the scope of the present invention.

What is claimed is:

1. A rotor assembly for a stepping motor, comprising:
  a rotor shaft;
  a protecting member fixedly mounted on said rotor shaft and including a hub portion extending coaxially with said rotor shaft, and at least one face portion radially outwardly extending from the hub portion; and
  a rotor magnet having an inner bore and an outer periphery each including an annular projection and etched areas, each of the annular projections being formed at a boundary between the etched areas, the annular projection of said inner bore engaging with the hub portion of said protecting member, whereby the rotor magnet is fixedly connected to the protecting member.

2. A rotor assembly for a stepping motor, comprising:
  a rotor shaft having a pinion integrally formed therewith;
  a protecting member fixedly mounted on said rotor shaft and including a hub portion extending coaxially with said rotor shaft, and at least one face portion radially outwardly extending from the hub portion; and
  a rotor magnet having an inner bore and an outer periphery each including an annular projection and etched areas, each of the annular projections being formed at a boundary between the etched areas, the annular projection of said inner bore engaging with the hub portion of said protecting member, whereby the rotor magnet is fixedly connected to the protecting member.

3. A rotor assembly as claimed in claim 2, in which said protecting member has at least one annular axial projection integral with the hub portion.

4. A rotor assembly as claimed in claim 1, in which said annular axial projection abuts against one side of said pinion.

5. A rotor assembly as claimed in claim 4, in which said rotor magnet has side surfaces, and in which the face portion of said protecting member engages with one side surface of said rotor magnet and the pinion of said rotor shaft engages with another side surface of said rotor magnet.

6. A rotor assembly as claimed in claim 4, in which said pinion has an annular recess formed therein, and the annular axial projection of said hub portion is accommodated in the annular recess of said pinion.

7. A rotor assembly as claimed in claim 6, in which the outer periphery of said rotor magnet is grounded after etching.

8. A rotor assembly as claimed in claim 6, in which the inner bore of said rotor magnet has a non-circular shape.

9. A rotor assembly for a stepping motor, comprising:
  a rotor shaft;

a protecting member fixedly mounted on said rotor shaft and including a hub portion extending coaxially with said rotor shaft, and at least one face portion radially outwardly extending from the hub portion; and a rotor magnet formed of amorphous substances and having an inner bore and an outer periphery each including an annular projection and etched areas, each of the annular projections being formed at a boundary between the etched areas, the annular projection of said inner bore engaging with the hub portion of said protecting member, whereby the rotor magnet is fixedly connected to the protecting member.

10. A rotor assembly for a stepping motor, comprising:

a rotor shaft having a pinion integrally formed therewith;

a protecting member fixedly mounted on said rotor shaft and including a hub portion extending coaxially with said rotor shaft, and at least one face portion radially outwardly extending from the hub portion; and a rotor magnet formed of amorphous substances and having an inner bore and an outer periphery each including an annular projection and etched areas, each of the annular projections being formed at a boundary between the etched areas, the annular projection of said inner bore engaging with the hub portion of said protecting member, whereby the rotor magnet is fixedly connected to the protecting member.

* * * * *